(12) United States Patent  
Yu et al.

(10) Patent No.: US 8,704,153 B2  
(45) Date of Patent: Apr. 22, 2014

(54) SIDE MOUNTING OPTICAL NAVIGATION MODULE

(75) Inventors: Xiaoming Yvonne Yu, Hong Kong (HK); Wai Vincent Hung, Hong Kong (HK); Francis Guillen Gamboa, Hong Kong (HK); Tak Kit Dennis Tong, Hong Kong (HK)

(73) Assignee: SAE Magnetics (H.K.) Ltd., Hong Kong (HK)

( * ) Notice: Subject to any disclaimer, the term of this patent is extended or adjusted under 35 U.S.C. 154(b) by 112 days.

(21) Appl. No.: 13/178,481

(22) Filed: Jul. 7, 2011

(65) Prior Publication Data

US 2013/0009046 A1    Jan. 10, 2013

(51) Int. Cl.
*G09G 5/08* (2006.01)

(52) U.S. Cl.
USPC ............................. 250/221; 345/157; 345/166

(58) Field of Classification Search
USPC ........... 250/221; 345/166, 168, 156–158, 163
See application file for complete search history.

(56) References Cited

U.S. PATENT DOCUMENTS

| | | | |
|---|---|---|---|
| 6,642,505 B1 * | 11/2003 | Nakano et al. | 250/221 |
| 7,138,620 B2 | 11/2006 | Trisnadi et al. | |
| 7,158,659 B2 | 1/2007 | Baharav et al. | |
| 7,164,782 B2 | 1/2007 | Baharav et al. | |
| 7,274,808 B2 | 9/2007 | Baharav et al. | |
| 8,232,966 B2 * | 7/2012 | Cheah et al. | 345/166 |
| 2009/0295718 A1 | 12/2009 | Cheah et al. | |
| 2010/0078545 A1 | 4/2010 | Leong et al. | |

\* cited by examiner

*Primary Examiner* — Tony Ko

(57) ABSTRACT

An optical navigation module for receiving control from an object disposed on an operation plane is provided. The optical navigation module includes a substrate defining a base plane that is perpendicular to the operation plane; a light source installed on the base plane of the substrate and configured to emit light to a side of the substrate; an optical structure installed at the side of the substrate; a light sensor installed on the base plane of the substrate; a light shield installed on the base plane of the substrate spatially separating the light source and the light sensor so that light emitted by the light source is not directly shed on the light sensor, the light shield having an aperture formed thereon; and a tactile switch for executing a command installed at a side of the light source that is opposite to the side facing the operation plane. The optical structure is configured to guide the light emitted from the light source to the object so that at least a portion of the light scattered by the object passes to the light sensor through the aperture on the light shield and forms a light intensity pattern on the light sensor.

12 Claims, 10 Drawing Sheets

SIDE MOUNTING OPTICAL NAVIGATION MODULE

FIELD OF THE PATENT APPLICATION

The present patent application relates to an optical navigation module and more particularly to a side mounting optical navigation module that has a reduced thickness and wide applications.

BACKGROUND

Optical navigation module is an essential component of consumer electronics requiring user input through a GUI (Graphical User Interface). As illustrated in FIG. 7, the typical key building blocks of an optical navigation module are a light sensor 701, a light source 703, a light shield 705 disposed around the light sensor 701, an optical element 707 and a substrate 709 for mounting all the above elements. In a conventional design, the plane 710 defined by the substrate, the light source emission surface and the light sensor sensing surface is always facing or in parallel with the tracking surface 711 of the module, which imposes a limit on the thickness of the optical navigation module and in turn a limit on the application of the optical navigation module.

SUMMARY

The present patent application is directed to an optical navigation module for receiving control from an object disposed on an operation plane. In one aspect, the optical navigation module includes a substrate defining a base plane that is perpendicular to the operation plane; a light source installed on the base plane of the substrate and configured to emit light to a side of the substrate; an optical structure installed at the side of the substrate; a light sensor installed on the base plane of the substrate; a light shield installed on the base plane of the substrate spatially separating the light source and the light sensor so that light emitted by the light source is not directly shed on the light sensor, the light shield having an aperture formed thereon; and a tactile switch for executing a command installed at a side of the light source that is opposite to the side facing the operation plane. The optical structure is configured to guide the light emitted from the light source to the object so that at least a portion of the light scattered by the object passes to the light sensor through the aperture on the light shield and forms a light intensity pattern on the light sensor.

The optical structure may include a slanted surface configured for bending the light from the light source toward the object at the operation plane. The slanted surface may be applied with a reflective coating. The optical structure may include two lens surfaces disposed next to the slanted surface, one of the lens surfaces facing the light source, the other one of the lens surfaces facing the operation plane. The optical structure may include two discrete parts separated by a gap. One of the two discrete parts may include a slanted surface without any reflective coating.

The optical structure may include a lens surface disposed next to the slanted surface, the lens surface facing the light source. The optical structure may further include an additional slanted surface configured for bending light coming from the other slanted surface toward the base plane.

In another aspect, the optical navigation module includes a substrate defining a base plane that is perpendicular to the operation plane; a light source installed on the base plane of the substrate and configured to emit light to a side of the substrate; an optical structure installed at the side of the substrate; a light sensor installed on the base plane of the substrate; and a light shield installed on the base plane of the substrate spatially separating the light source and the light sensor so that light emitted by the light source is not directly shed on the light sensor, the light shield having an aperture formed thereon. The optical structure is an integral structure made by a light transmissive material, and is configured to guide the light emitted from the light source to the object so that at least a portion of the light scattered by the object is transmitted to the light sensor through the aperture on the light shield.

The optical structure may include a slanted surface configured for bending the light from the light source toward the object at the operation plane. The slanted surface may be applied with a reflective coating. The optical structure may include a lens surface disposed next to the slanted surface, the lens surface facing the light source. The optical structure may further include an additional slanted surface configured for bending light coming from the other slanted surface toward the base plane.

In yet another aspect, the optical navigation module includes a substrate defining a base plane that is perpendicular to the operation plane; a light source installed on the base plane of the substrate and configured to emit light to a side of the substrate; an optical structure installed at the side of the substrate; a light sensor installed on the base plane of the substrate; and a light shield installed on the base plane of the substrate spatially separating the light source and the light sensor so that light emitted by the light source is not directly shed on the light sensor, the light shield having an aperture formed thereon. The optical structure includes two discrete parts separated by a gap, being made by a light transmissive material, and being configured to guide the light emitted from the light source to the object so that at least a portion of the light scattered by the object is transmitted to the light sensor through the aperture on the light shield.

The optical structure may include a slanted surface configured for bending the light from the light source toward the object at the operation plane. The optical structure may include two lens surfaces disposed next to the slanted surface, one of the lens surfaces facing the light source, the other one of the lens surfaces facing the operation plane. The slanted surface may be applied with a reflective coating.

One of the two discrete parts may include a slanted surface without any reflective coating. The light source may be an infrared light source. The refractive index of the light transmissive material may be between 1.56 and 1.7.

BRIEF DESCRIPTIONS OF THE DRAWINGS

DETAILED DESCRIPTION

Reference will now be made in detail to a preferred embodiment of the side mounting optical navigation module disclosed in the present patent application, examples of which are also provided in the following description. Exemplary embodiments of the side mounting optical navigation module disclosed in the present patent application are described in detail, although it will be apparent to those skilled in the relevant art that some features that are not particularly important to an understanding of the side mounting optical navigation module may not be shown for the sake of clarity.

Furthermore, it should be understood that the side mounting optical navigation module disclosed in the present patent application is not limited to the precise embodiments described below and that various changes and modifications thereof may be effected by one skilled in the art without departing from the spirit or scope of the protection. For example, elements and/or features of different illustrative embodiments may be combined with each other and/or substituted for each other within the scope of this disclosure.

Figure 1A:
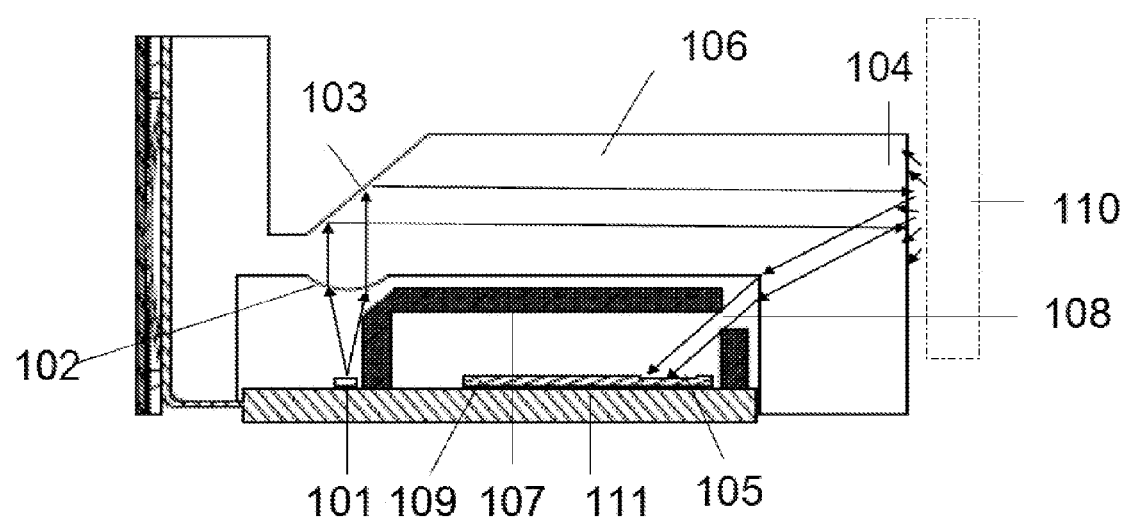
FIG. 1A is a cross-sectional view of a side mounting optical navigation module according to an embodiment of the present patent application.

FIG. 1A is a cross-sectional view of a side mounting optical navigation module according to an embodiment of the present patent application. Referring to FIG. 1, the side mounting optical navigation module includes a coherent infrared (IR) light source 101, a sensor IC 109, a light shield 107, a lens block 106 and a substrate PCB (printed circuit board) 111 on which all other components are accommodated. The light shield 107 is made of light absorbing material and contains an aperture 108. The sensor IC 109 is located in the enclosure of the light shield 107. The lens block 106 encloses the light source 101, the sensor IC 109 and the light shield 107, and is positioned on the substrate 111. The lens block 106 is made of a light transmissive material with high transparency for the wavelength bands of the optical signal generated by the IR light source 101. Preferably, the refractive index of the light transmissive material is between 1.56 and 1.7.

Light emitted from the coherent IR light source 101 is transformed to a collimated or near-collimated beam by the lens surface 102 and is bent by 90 degrees at the slanted surface 103 by total internal reflection and steered toward a tracking surface (or operation plane) 104 of the module. The distance from the light source 101 to the lens surface 102 could be less than 0.5 mm. The full distance from the IR light source 101 to the top of the slanted surface 103 could be controlled to be within 1 mm. The distance from the slanted surface 103 to the tracking surface 104 is variable since the light coming out from the slanted surface 103 is a parallel light beam.

When an object 110 is present near the tracking surface 104, a portion of the IR light emitted from the IR light source 101 is scattered back into the optical navigation module. A portion of the back-scattered light passes through an aperture 108 and forms a speckle pattern on the sensor IC 109. The speckle pattern is detected by the sensor array 105 on the surface of the sensor IC 109. It is understood, as described here and hereafter, the speckle pattern may be other types of light intensity patterns. It is further understood that the lens block 106 is illustrated in this embodiment as an exemplary optical structure that is configured to guide the light emitted from the light source 101 to the object 110 so that at least a portion of the light scattered by the object 110 passes to the light sensor 109 through the aperture 108 on the light shield 107 and forms a light intensity pattern on the light sensor 109.

Figure 1B:
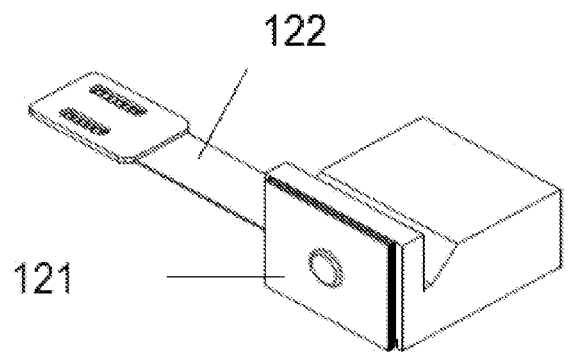
FIG. 1B illustrates a tactile switch and a rigid flex of the side mounting optical navigation module depicted in FIG. 1A.
Figure 1C:
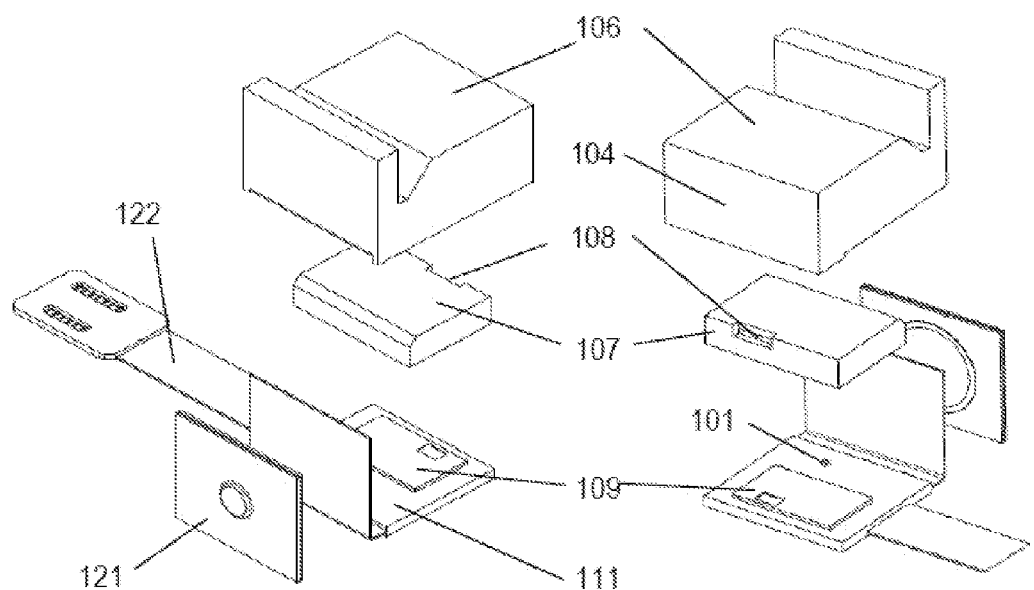
FIG. 1C is an exploded view of the side mounting optical navigation module depicted in FIG. 1A.

FIG. 1B illustrates a tactile switch and a rigid flex of the side mounting optical navigation module depicted in FIG. 1A. FIG. 1C is an exploded view of the side mounting optical navigation module depicted in FIG. 1A. Referring to FIG. 1B and FIG. 1C, the side mounting optical navigation module can optionally include a tactile switch 121 and a rigid flex 122 installed at a side of the light source 101 that is opposite to the side facing the tracking surface 104. When the finger presses on the tracking surface 104, the tactile switch 121 can be closed and used to execute a certain selection command. All the electrical signals, including the movement information and the tactile switch signals are transferred to a processor through the rigid flex 122.

Figure 2A:
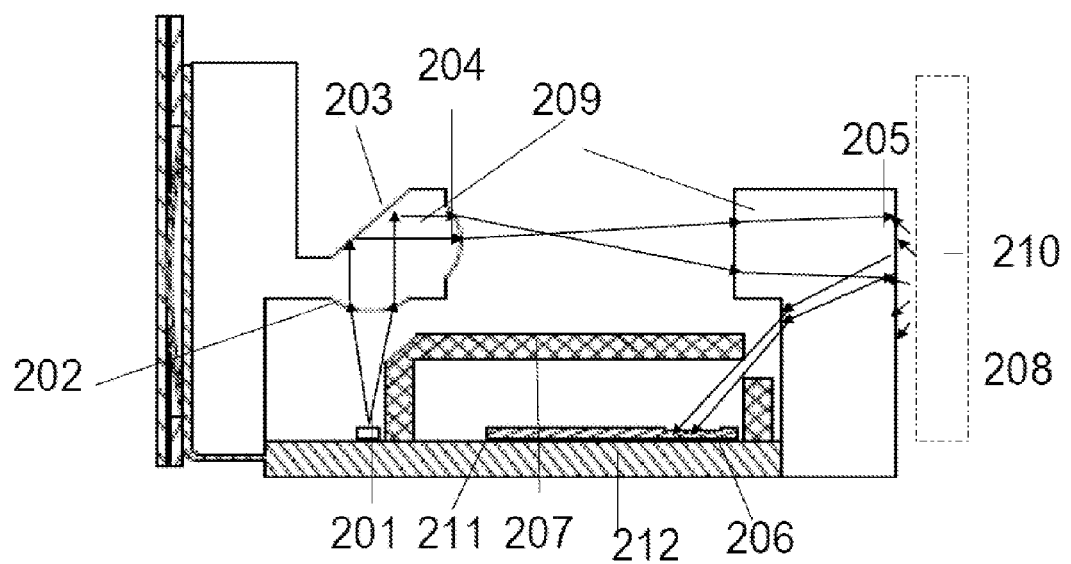
FIG. 2A is a cross-sectional view of a side mounting optical navigation module according to another embodiment of the present patent application.

FIG. 2A is a cross-sectional view of a side mounting optical navigation module according to another embodiment of the present patent application. Referring to FIG. 2A, the optical navigation module includes a coherent infrared (IR) light source 201, a sensor IC 211, a light shield 207, a lens block 209 and a substrate PCB 212. The arrangement of these components is identical to the embodiment illustrated in FIG. 1A except for the design of the lens block 209.

Light emitted from the coherent IR light source 201 is collimated or near-collimated by the first lens surface 202 and is bent by 90 degrees at the slanted surface 203 by total internal reflection and steered toward the tracking surface 205 through the second lens surface 204 to form a larger illumination area. The distance from the light source 201 to the first lens surface 202 could be less than 0.5 mm. Full distance from the IR light source 201 to the top of the slanted surface 203 could be controlled within 1 mm. The distance from the second lens surface 204 to the tracking surface 205 is also within 1 mm. Thickness of the tracking surface (IR side cover) 205 is in the range of 0.5 mm to 1.5 mm depending on the module size requirement. The light spot size on the IR interface can be adjusted by adjusting the profile of the second lens 204 and the distance between the second lens 204 and the tracking surface 205. As such, the optical navigation module in this embodiment can be applied to devices that require different widths of the optical navigation module. The light spot in this embodiment has a wider spatial distribution, which will reduce the sensor's lift off distance.

When an object 210 is present near the tracking surface 205, a portion of the IR light emitted from the IR light source 201 is scattered back into the module. A portion of the back-scattered light passes through the aperture 208 and forms a speckle pattern on the sensor IC 211 and is detected by the sensor array 206 on the surface of the sensor IC 211. It is understood that the lens block 209 is illustrated in this embodiment as an exemplary optical structure that is configured to guide the light emitted from the light source 201 to the object 210 so that at least a portion of the light scattered by the object 210 passes to the light sensor 211 through the aperture 208 on the light shield 207 and forms a light intensity pattern on the light sensor 211.

Figure 2B:
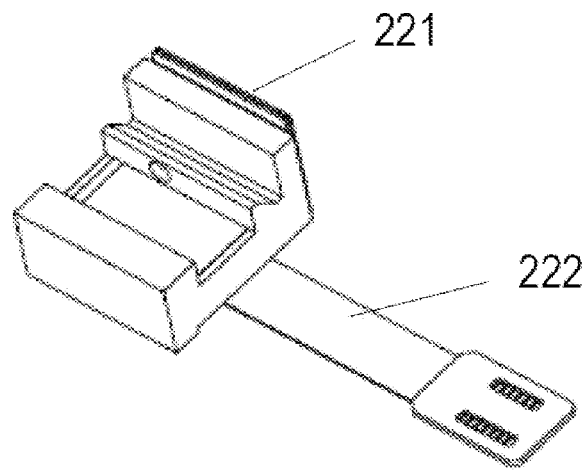
FIG. 2B illustrates a tactile switch and a rigid flex of the side mounting optical navigation module depicted in FIG. 2A.
Figure 2C:
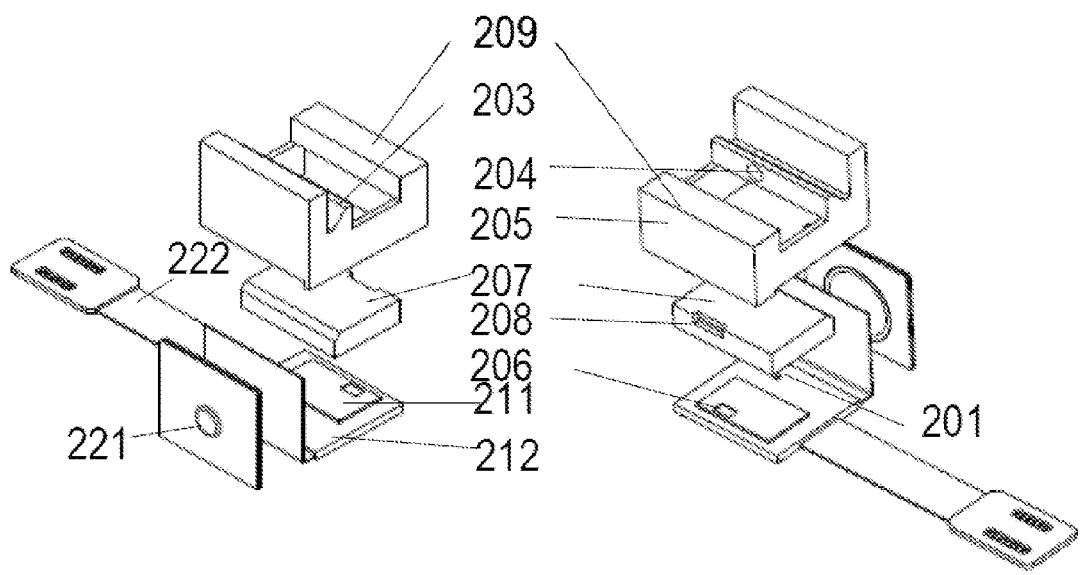
FIG. 2C is an exploded view of the side mounting optical navigation module depicted in FIG. 2A.

FIG. 2B illustrates a tactile switch and a rigid flex of the side mounting optical navigation module depicted in FIG. 2A. FIG. 2C is an exploded view of the side mounting optical navigation module depicted in FIG. 2A. Referring to FIG. 2B and FIG. 2C, the optical navigation module can optionally include a tactile switch 221 and a rigid flex 222 installed at a side of the light source 201 that is opposite to the side facing the tracking surface 205. When the finger presses on the tracking surface 205, the tactile switch 221 can be closed and can be used to execute a certain selection command. All the electrical signals, including the movement information and the tactile switch signals are transferred to the processor through the rigid flex 222.

Figure 3A:
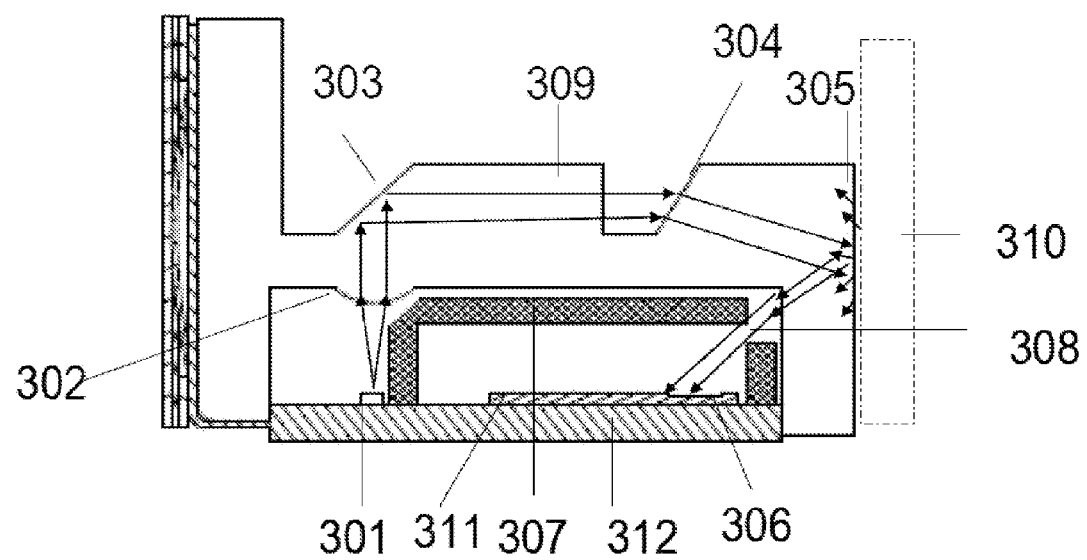
FIG. 3A is a cross-sectional view of a side mounting optical navigation module according to yet another embodiment of the present patent application.

FIG. 3A is a cross-sectional view of a side mounting optical navigation module according to yet another embodiment of the present patent application. Referring to FIG. 3A, the optical navigation module includes a coherent infrared (IR) light source 301, a sensor IC 311, a light shield 307, a lens block 309 and a substrate PCB 312. The arrangement of these components is identical to the aforementioned embodiments except for the design of the lens block 309.

Light emitted from the coherent IR light source 301 is transformed to a collimated or near-collimated beam by a lens surface 302, bent by 90 degrees at a first slanted surface 303 by total internal reflection, and steered toward the tracking surface 305 through a second slanted surface 304 so as to be bent toward the center of the module sensing region. The distance from the light source 301 to the lens surface 302 could be less than 0.5 mm. The full distance from the IR light source 301 to the top of the first slanted surface 303 could be controlled within 1 mm. The distance from the second slanted surface 304 to the tracking surface 305 is also within 1 mm depending on the module size and height requirements. The light spot size on the IR interface could be adjusted by adjusting the slant angle of the second slanted surface 304 as well as the distance between the second slanted surface 304 and the tracking surface 305. As such, the optical navigation module in this embodiment can be applied in thinner devices.

When an object 310 is present near the tracking surface 305, a portion of the IR light emitted from the IR light source 301 is scattered back into the optical navigation module. A portion of the back-scattered light passes through the aperture 308 and forms a speckle pattern on the sensor IC 311 and is detected by the sensor array 306 on the surface of the sensor IC 306. It is understood that the lens block 309 is illustrated in this embodiment as an exemplary optical structure that is configured to guide the light emitted from the light source 301 to the object 310 so that at least a portion of the light scattered by the object 310 passes to the light sensor 311 through the aperture 308 on the light shield 307 and forms a light intensity pattern on the light sensor 311.

Figure 3B:
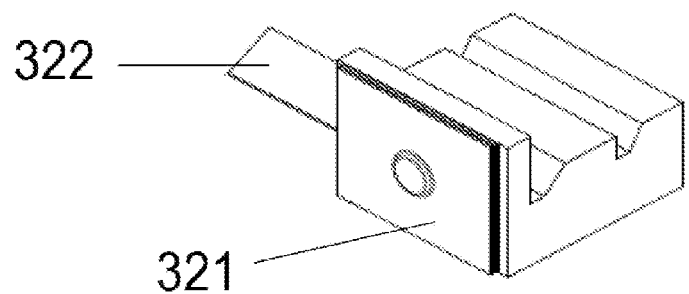
FIG. 3B illustrates a tactile switch and a rigid flex of the side mounting optical navigation module depicted in FIG. 3A.
Figure 3C:
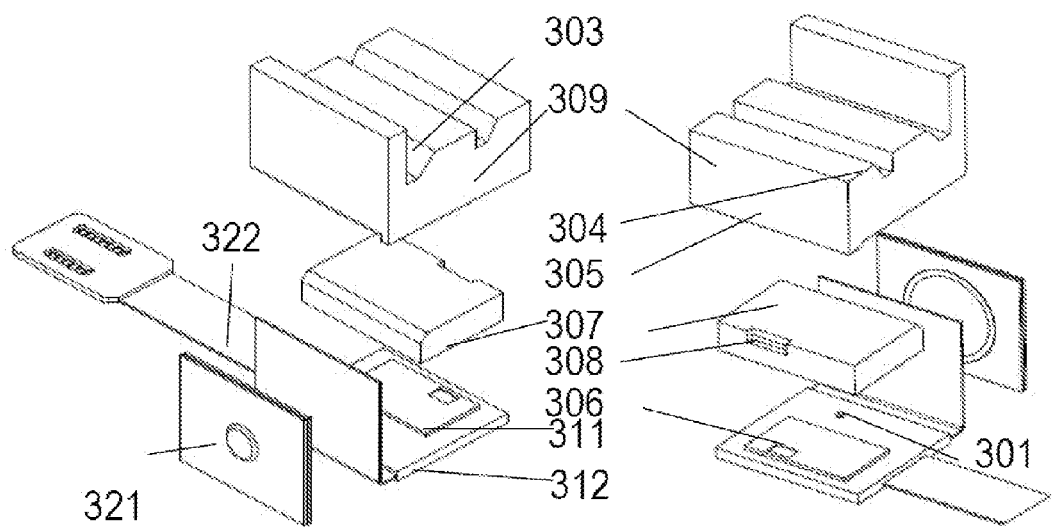
FIG. 3C is an exploded view of the side mounting optical navigation module depicted in FIG. 3A.

FIG. 3B illustrates a tactile switch and a rigid flex of the side mounting optical navigation module depicted in FIG. 3A. FIG. 3C is an exploded view of the side mounting optical navigation module depicted in FIG. 3A. Referring to FIG. 3B and FIG. 3C, the optical navigation module can optionally include a tactile switch 321 and a rigid flex 322 installed at a side of the light source 301 that is opposite to the side facing the tracking surface 305. When a finger of the user presses on the tracking surface 305, the tactile switch 321 can be closed and can be used to execute a certain selection command. And all the electrical signals, including the movement information and tactile switch signals are transferred to the processor through the rigid flex 322.

Figure 4:
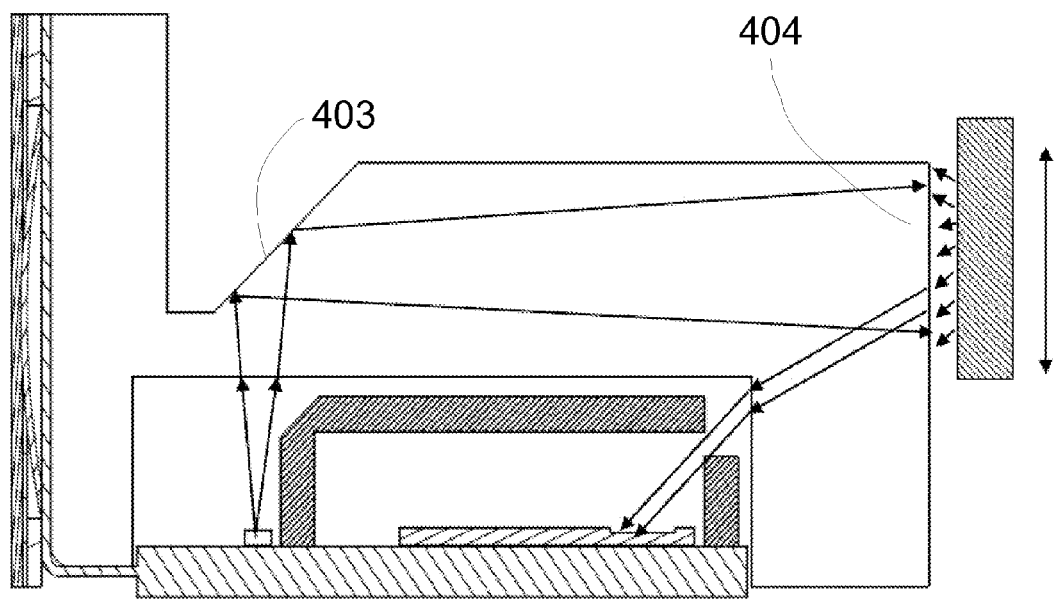
FIG. 4 is a cross-sectional view of a side mounting optical navigation module according to still another embodiment of the present patent application.

FIG. 4 is a cross-sectional view of a side mounting optical navigation module according to still another embodiment of the present patent application. Referring to FIG. 4, the optical navigation module in this embodiment is similar to the embodiment depicted in FIG. 1, except that the lens surface 102 in FIG. 1 is eliminated in this embodiment. To bend the light beam toward to the tracking surface 404, a reflective coating is applied to the slanted surface 403 so that the slanted surface 403 becomes a mirror surface. Preferably, the sloping angle of the slanted surface 403 is 45 degrees.

Figure 5:
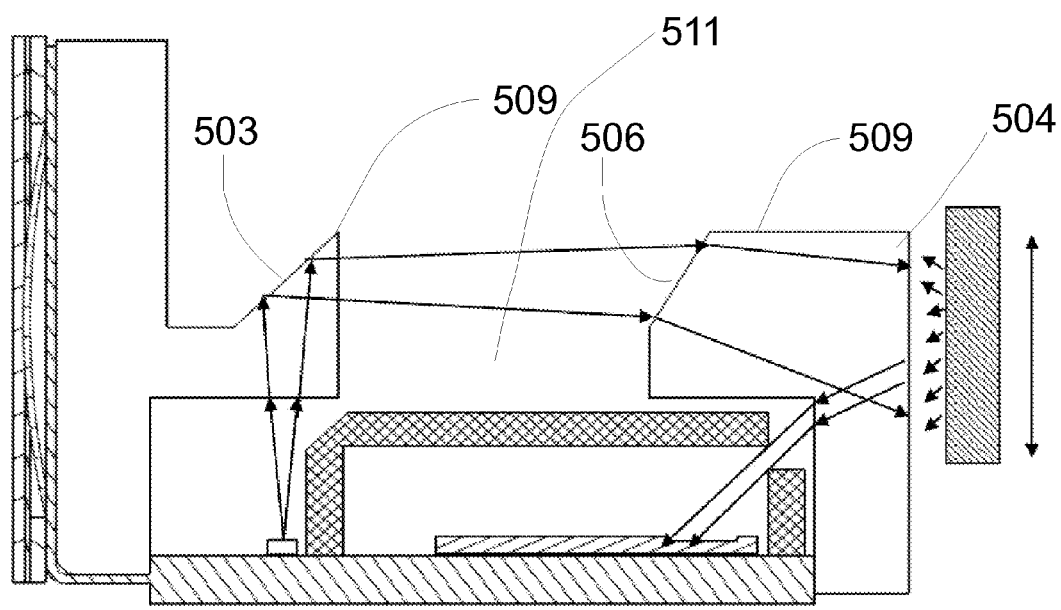
FIG. 5 is a cross-sectional view of a side mounting optical navigation module according to still another embodiment of the present patent application.

FIG. 5 is a cross-sectional view of a side mounting optical navigation module according to still another embodiment of the present patent application. Referring to FIG. 5, the optical navigation module in this embodiment is similar to the embodiment depicted in FIG. 4, except that the optical structure 509 is not continuous in this embodiment. More specifically, the optical structure 509 includes two discrete parts separated by a gap 511. To bend the light beam toward to the tracking surface 504, a reflective coating is applied to the slanted surface 503 so that the slanted surface 503 becomes a mirror surface. In addition, another slanted surface 506 without any reflective coating is added to guide the light toward the tracking surface 504. Preferably, the sloping angle of the slanted surface 503 is 45 degrees. It is understood that the sensitive spot position on the tracking surface 504, where the optical navigation module has a relatively high sensitivity for an object disposed nearby, can be adjusted by the sloping angle of the slanted surface 506.

Figure 6:
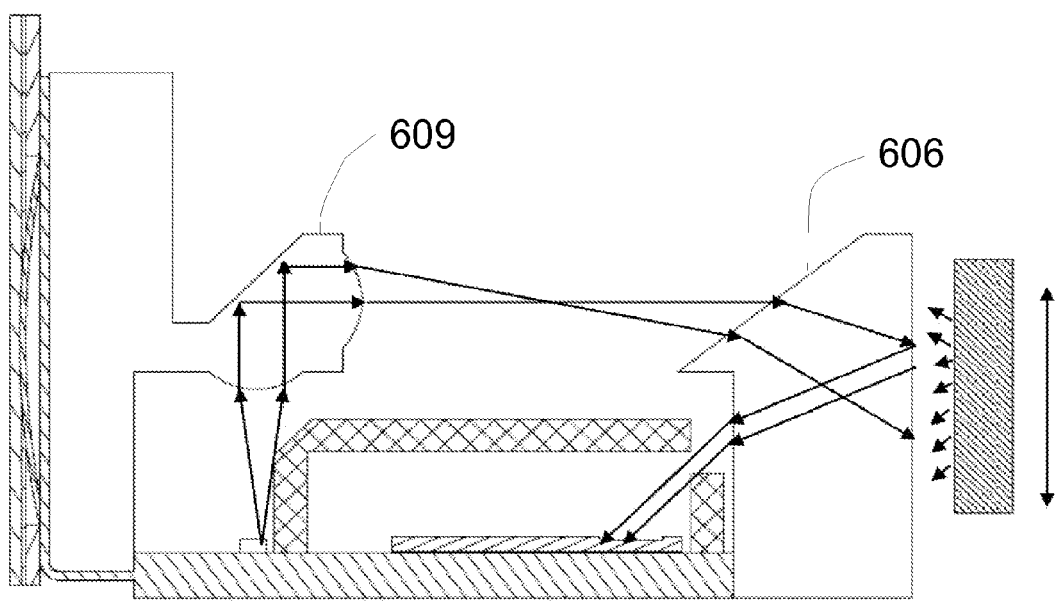
FIG. 6 is a cross-sectional view of a side mounting optical navigation module according to still another embodiment of the present patent application.
Figure 7:
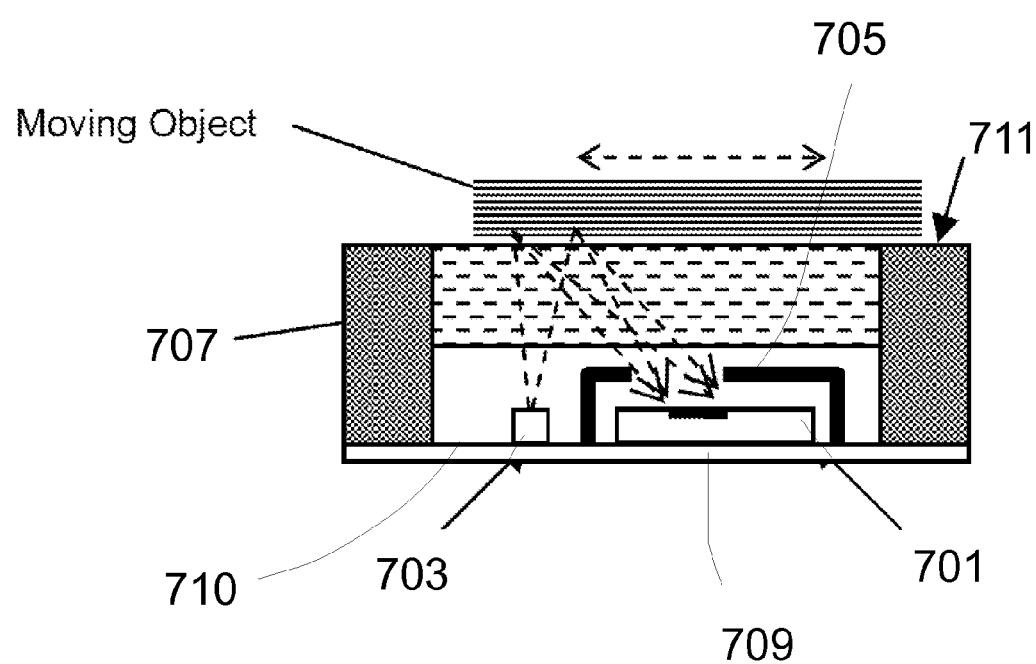
FIG. 7 is a cross-sectional view of an optical navigation module according to a conventional design.

FIG. 6 is a cross-sectional view of a side mounting optical navigation module according to still another embodiment of the present patent application. Referring to FIG. 6, the optical navigation module in this embodiment is similar to the embodiment depicted in FIG. 2A, except that a portion of the lens block 209 (corresponding to the lens block 609 in FIG. 6) is substituted by a slanted surface 606. No reflective coating is needed in the lens block 609. Both spot size and spot position can be adjusted and hence there is more room for sensitive functions. It is understood that in this embodiment, the light is bent by 90 degrees at the surface 603 by total internal reflection. It is further understood that the lens block 609 is illustrated in this embodiment as an exemplary optical structure that is configured to guide the light emitted from the light source to the object so that at least a portion of the light scattered by the object passes to the light sensor through the aperture on the light shield and forms a light intensity pattern on the light sensor.

In the above embodiments, the optical navigation module is capable of being controlled by an object, for example, a user's finger, placed at an operation plane that is perpendicular to, instead of in parallel with or facing, the base plane defined by the substrate on which the light source and the light sensor are installed. As such, the optical navigation module has a reduced thickness and can be used not only by being placed in parallel to a display panel on a consumer device, but also by being installed to a side of the device, therefore having wide applications.

While the present patent application has been shown and described with particular references to a number of embodiments thereof, it should be noted that various other changes or modifications may be made without departing from the scope of the present invention.

What is claimed is:

1. An optical navigation module for receiving control from an object disposed on an operation plane, the optical navigation module comprising:
   a substrate defining a base plane that is perpendicular to the operation plane;
   a light source installed on the base plane of the substrate and configured to project light to a side of the substrate;
   an optical structure installed at the side of the substrate;
   a light sensor installed on the base plane of the substrate;
   a light shield installed on the base plane of the substrate spatially separating the light source and the light sensor so that light projected by the light source is not directly shed on the light sensor, the light shield having an aperture formed thereon; and
   a tactile switch for executing a command installed at a side of the light source that is opposite to the side facing the operation plane;
   wherein:
   the optical structure is configured to guide the light projected from the light source to the object so that at least a portion of the light scattered by the object passes to the light sensor through the aperture on the light shield and forms a speckle pattern on the light sensor; and
   wherein the optical structure comprises only one slanted surface without a second or more slanted surfaces configured for bending the light from the light source toward the object at the operation plane.

2. The optical navigation module of claim 1, wherein the slanted surface is applied with a reflective coating.

3. The optical navigation module of claim 1, wherein the optical structure comprises two lens surfaces disposed next to the slanted surface, one of the lens surfaces facing the light source, the other one of the lens surfaces facing the operation plane.

4. The optical navigation module of claim 1, wherein the optical structure comprises two discrete parts separated by a gap.

5. The optical navigation module of claim 4, wherein one of the two discrete parts comprises a slanted surface without any reflective coating.

6. The optical navigation module of claim 1, wherein the optical structure comprises only one lens surface disposed next to the slanted surface, the only one lens surface facing the light source.

7. The optical navigation module of claim 6, wherein the optical structure further comprises an additional slanted surface configured for bending light coming from the other slanted surface toward the base plane.

8. The optical navigation module of claim 1, wherein the substrate is located at the bottom of the optical navigation module; and the operation plane is located at the side of the optical navigation module.

9. An optical navigation module for receiving control from an object disposed on an operation plane, the optical navigation module comprising:
   a substrate defining a base plane that is perpendicular to the operation plane;
   a light source installed on the base plane of the substrate and configured to project light to a side of the substrate;
   an optical structure installed at the side of the substrate;
   a light sensor installed on the base plane of the substrate; and
   a light shield installed on the base plane of the substrate spatially separating the light source and the light sensor so that light projected by the light source is not directly shed on the light sensor,
   the light shield having an aperture formed thereon;
   wherein:
   the optical structure is an integral structure made by a light transmissive material, and is configured to guide the light projected from the light source to the object so that at least a portion of the light reflected by the object is transmitted to the light sensor through the aperture on the light shield; and
   wherein the optical structure comprises only one slanted surface without a second or more slanted surfaces configured for bending the light from the light source toward the object at the operation plane.

10. The optical navigation module of claim 9, wherein the optical structure comprises only one lens surface disposed next to the slanted surface, the only one lens surface facing the light source.

11. The optical navigation module of claim 10, wherein the optical structure further comprises an additional slanted surface configured for bending light coming from the other slanted surface toward the base plane.

12. The optical navigation module of claim 9, wherein the slanted surface is applied with a reflective coating.

* * * * *